(12) United States Patent
Baek et al.

(10) Patent No.: US 7,643,123 B2
(45) Date of Patent: Jan. 5, 2010

(54) LIQUID CRYSTAL DISPLAY DEVICE COMPRISING BUBBLE TRAPS AND METHOD OF FABRICATING THE SAME

(75) Inventors: Se Joon Baek, Busan (KR); Hae Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 404 days.

(21) Appl. No.: 11/167,217

(22) Filed: Jun. 28, 2005

(65) Prior Publication Data

US 2006/0119780 A1    Jun. 8, 2006

(30) Foreign Application Priority Data

Dec. 3, 2004    (KR) ............. 10-2004-0101448

(51) Int. Cl.
*G02F 1/1339* (2006.01)
*G02F 1/1341* (2006.01)

(52) U.S. Cl. ............. 349/154; 349/153; 349/156; 349/189; 349/190

(58) Field of Classification Search ........... 349/153, 349/154, 189, 190; 445/25; 313/512
See application file for complete search history.

(56) References Cited

U.S. PATENT DOCUMENTS

| | | | |
|---|---|---|---|
| 5,037,185 A * | 8/1991 | Grupp | 349/195 |
| 6,163,357 A * | 12/2000 | Nakamura | 349/155 |
| 6,222,603 B1 * | 4/2001 | Sakai et al. | 349/153 |
| 6,320,638 B1 * | 11/2001 | Youn | 349/154 |
| 6,392,736 B1 * | 5/2002 | Furukawa et al. | 349/158 |
| 6,542,215 B2 * | 4/2003 | Lee et al. | 349/153 |
| 7,009,675 B2 * | 3/2006 | Han et al. | 349/153 |
| 7,136,134 B2 * | 11/2006 | Yoshizoe | 349/154 |
| 2003/0086050 A1 | 5/2003 | Lee et al. | 349/153 |
| 2003/0218710 A1 * | 11/2003 | Hong | 349/122 |
| 2004/0032558 A1 * | 2/2004 | Liu et al. | 349/153 |
| 2004/0070722 A1 * | 4/2004 | Park | 349/153 |
| 2004/0160566 A1 * | 8/2004 | Kawabe et al. | 349/153 |
| 2004/0183987 A1 | 9/2004 | Suzuki | 349/153 |

FOREIGN PATENT DOCUMENTS

| | | |
|---|---|---|
| JP | 54-107752 | 8/1979 |
| JP | 58-196525 | 11/1983 |
| JP | 59-119324 | 7/1984 |
| JP | 5-5890 | 1/1993 |
| JP | 2002-162634 | 6/2002 |

* cited by examiner

*Primary Examiner*—Andrew Schechter
*Assistant Examiner*—Charles Chang
(74) *Attorney, Agent, or Firm*—Morgan Lewis & Bockius LLP

(57) ABSTRACT

A liquid crystal display device includes a liquid crystal display panel having a liquid crystal area defined within a display area by a sealant, and a non-display area formed in an outer part of the display area, and at least one bubble trap arranged in the outer part of the sealant within the non-display area and patterned to have a concave surface facing toward outside of the non-display area.

2 Claims, 7 Drawing Sheets

LIQUID CRYSTAL DISPLAY DEVICE COMPRISING BUBBLE TRAPS AND METHOD OF FABRICATING THE SAME

The present application claims the benefit of the Korean Patent Application No. P2004-101448 filed in Korea on Dec. 3, 2004, which is hereby incorporated by reference.

BACKGROUND OF THE INVENTION

1. Field of the Invention

The present invention relates to a liquid crystal display (LCD) device, and more particularly to an LCD device that prevents formation of bubbles at an display screen area where an image is displayed, and to a method of fabricating an LCD device that controls formation of bubbles which is generated during a process of forming liquid crystal.

2. Description of the Related Art

In general, an LCD device controls light transmissivity of liquid crystal material by application of an electric field in order to display images. Accordingly, the LCD device includes a liquid crystal display panel having liquid crystal cells arranged in a matrix configuration and a drive circuit in order to drive the liquid crystal display panel. The liquid crystal display panel includes pixel electrodes to induce an electric field to each of the liquid crystal cells and a reference electrode, which is commonly called a common electrode. The pixel electrodes are formed on a lower substrate corresponding to the liquid crystal cells, and the common electrode is formed along an entire surface of an upper substrate. In addition, each of the pixel electrodes are connected to a thin film transistor (TFT), which is used as a switching device. Accordingly, the pixel electrodes together with the common electrode drive the liquid crystal cell in accordance with data signals supplied through the TFT.

FIG. 1 is a perspective view of an LCD panel according to the related art. In FIG. 1, an LCD panel includes an upper array substrate 10 and a lower array substrate 20 which are bonded together with a liquid crystal material 8 therebetween. The liquid crystal material 8 includes molecules that rotate in response to an applied electric field, thereby controlling an amount of transmitted light that is incident through the lower array substrate 20.

In FIG. 1, the upper array substrate 10 includes a color filter 4, a common electrode 6, and an upper alignment film (not shown) that are formed on the rear surface of an upper substrate 1. The color filter 4 includes red R, green G, and blue B color filters and allows light of a specific wavelength range to be transmitted, thereby displaying images having specific colors. In addition, a black matrix 2 is formed between color filters 4 of adjacent colors in order to absorb the light that is incident from the adjacent cell, thereby preventing its contrast from deteriorating.

The lower array substrate 20 has a plurality of gate lines 12 and data lines 18 that are formed along an entire surface of the lower substrate 21 to cross each other, and are insulated from each other with a gate insulating film therebetween. In addition, a TFT 16 is formed at each of the intersection areas of the gate and data lines 12 and 18.

The TFT 16 includes a gate electrode connected to the gate line 12, a source electrode connected to the data line 18, and a drain electrode corresponding to the source electrode with a channel part therebetween, wherein the channel part includes an active layer and an ohmic contact layer. In addition, the TFT 16 is connected to the pixel electrode 14 through a contact hole which penetrates a passivation film (not shown). The TFT 16 selectively supplies a data signal transmitted along the data line 18 to the pixel electrode 14 in response to a gate signal transmitted along the gate line 12.

The pixel electrode 14 is located at a cell area that is divided by the gate and data lines 12 and 18, and is formed of a transparent conductive material having high light transmissivity. Accordingly, a potential difference is generated between the pixel electrode 14 and the common electrode 6 by the data signal supplied through the drain electrode. The potential difference generated between the pixel electrode 14 and the common electrode 6 causes the molecules of the liquid crystal material 8 located between the lower substrate 21 and the upper substrate 1 to rotate due to a dielectric anisotropy of the liquid crystal material 8. Accordingly, the light supplied from a light source through the pixel electrode 14 is transmitted toward the upper substrate 1.

Although not shown, the upper array substrate 10 and the lower array substrate 20 sustain a cell gap by a pattern spacer. In addition, the liquid crystal material 8 is injected into an inner space provided by the pattern spacer between the upper and lower array substrates 10 and 20.

A fabricating process for the LCD panel is divided into individual processes of substrate cleaning, substrate patterning, alignment film forming/rubbing, substrate bonding/liquid crystal injection, mounting, inspection, and repair. During the substrate bonding/liquid crystal injection process, the upper array substrate 10 and the lower array substrate 20 are bonded together by use of a sealant (not shown), the liquid crystal material 8 is injected through a liquid crystal injection hole (not shown), and then the liquid crystal injection hole is sealed.

During the liquid crystal injection process, the liquid crystal material 8 and the spacer (not shown) are injected after the sealant is patterned while bonding the upper array substrate 10 and the lower array substrate 20 together. However, bubbles are inevitably generated during the process of injecting the liquid crystal material 8 and the spacer (not shown) into the space which is formed between the upper and lower array substrates 10 and 20, within a vacuum chamber (not shown). Accordingly, defects are generated in the LCD panel due to the formation of the bubbles in the LCD panel. In other words, the bubbles remaining behind on an display screen area where images are displayed should be removed by controlling the liquid crystal injection process.

SUMMARY OF THE INVENTION

Accordingly, the present invention is directed to an LCD device that substantially obviates one or more of the problems due to limitations and disadvantages of the related art.

An object of the present invention is to provide an LCD device that prevents formation of bubbles during liquid crystal formation processing.

Another object of the present invention is to provide a method of fabricating an LCD device that prevents formation of bubbles during liquid crystal formation processing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel having a liquid crystal area defined within a display area by a sealant, and a non-display area formed in an outer part of the display area, and at least one bubble trap arranged in the outer part of the sealant within the non-display area and patterned to have a concave surface facing toward outside of the non-display area.

In another aspect, a method of fabricating a liquid crystal display device having a display area and a non-display area located at an outer part of the display area includes patterning at least one bubble trap in the non-display area in any one of an upper plate and a lower plate, the bubble trap having a concave surface facing toward outside of the non-display area, forming a sealant to limit a liquid crystal area of the display area in any one of the upper plate and the lower plate, injecting a liquid crystal into the liquid crystal area, and bonding the upper plate and the lower plate by use of the sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
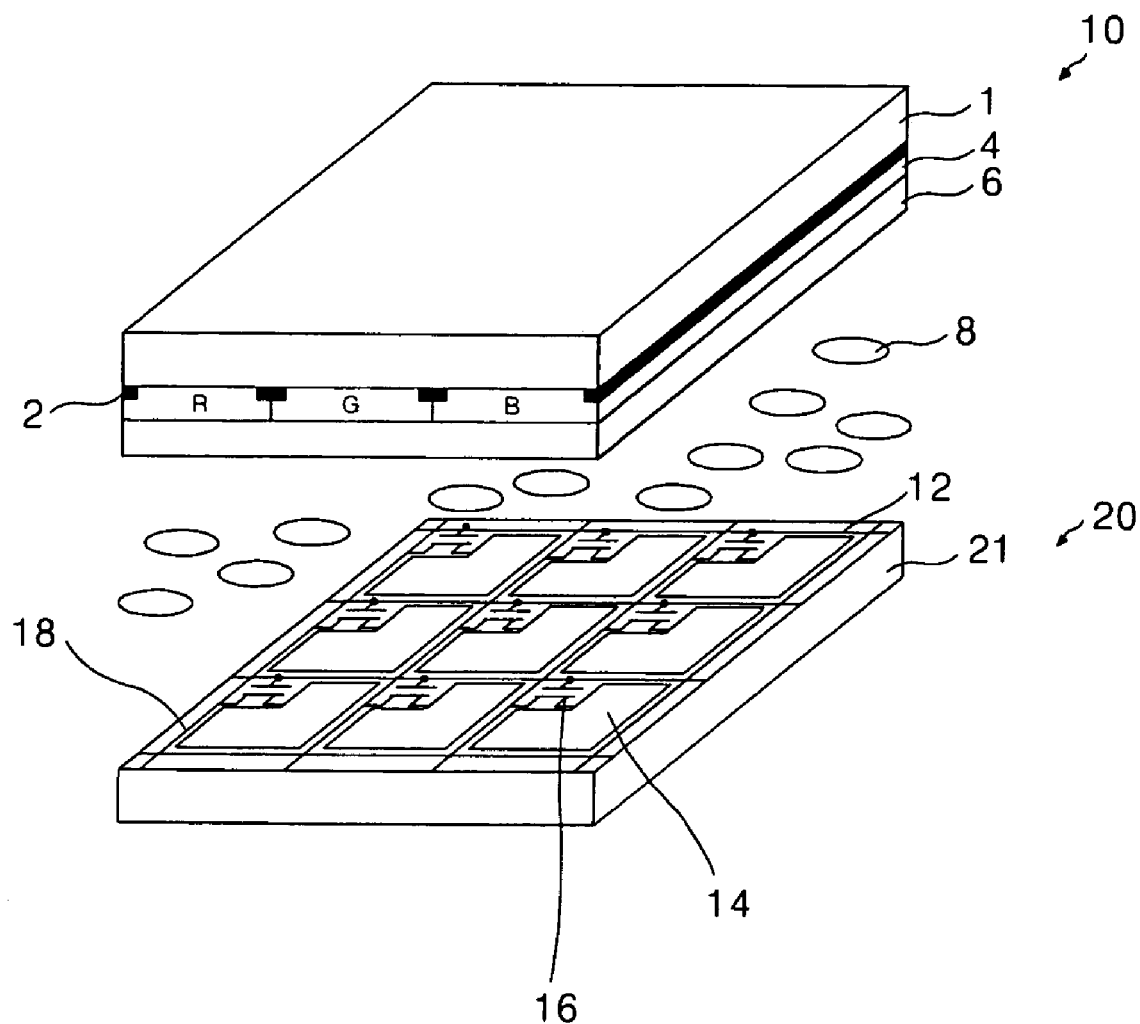
FIG. 1 is a perspective view of an LCD panel according to the related art.
Figure 2:
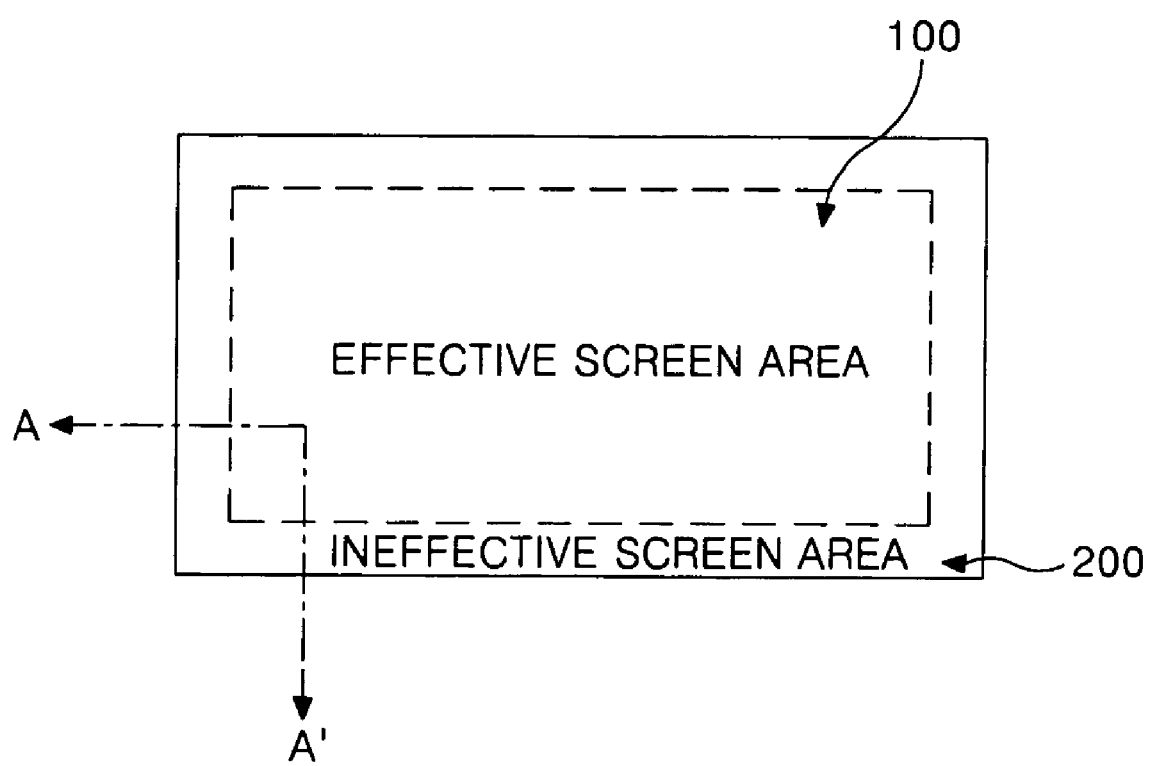
FIG. 2 is a schematic plan view of an exemplary screen display area of an LCD device according to the present invention.

FIG. 2 is a schematic plan view of an exemplary screen display area of an LCD device according to the present invention. In FIG. 2, an LCD device may include an display screen area 100 where liquid crystal display elements are arranged to display images, and an indisplay screen area 200 at the outer part of the display screen area. In the display screen area 100, the liquid crystal display elements are arranged to display images in accordance with data signals supplied from a drive circuit (not shown). In addition, in the indisplay screen area 200, a sealant is formed for bonding the upper array substrate and the lower array substrate during a substrate bonding/ liquid crystal formation process during fabrication of the LCD device.

Figure 3:
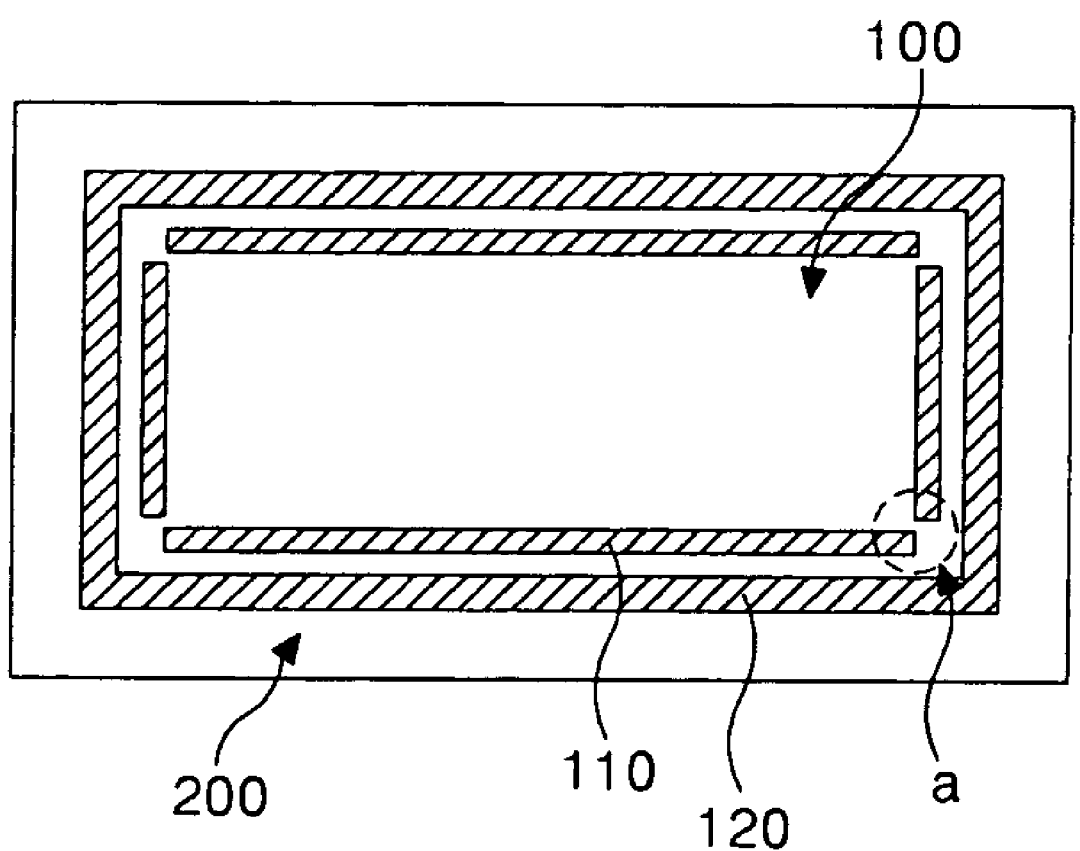
FIG. 3 is a schematic plan view of an exemplary LCD panel according to the present invention.

FIG. 3 is a schematic plan view of an exemplary LCD panel according to the present invention. In FIG. 3, a first sealant 110 may be formed along an outer part of the display screen area 100 of the LCD panel, and a second sealant 120 may be formed separated from the first sealant 110 with a designated distance therebetween toward the outer part of the panel. The first and second sealants 110 and 120 may be formed having a closed loop shape with a designated thickness at the outer part of the LCD panel, thereby defining a liquid crystal formation area between the upper array substrate and the lower array substrate.

In FIG. 3, a moving space "a," where bubbles may be moved, may be formed at a corner area of the first sealant 110. Accordingly, the bubbles generated during formation formation of liquid crystal material into the display screen area 100 may escape to the indisplay screen area 200 where the first sealant 110 and the second sealant 120 are formed through the moving space "a"

In the LCD device, after forming the liquid crystal material on the upper array substrate or on the lower array substrate, if the upper array substrate and the lower array substrate are bonded together, then the liquid crystal material may spread out onto the whole panel by a pressure between the substrates.

In FIG. 3, when the first sealant 10 and the second sealant 120, which restricts the liquid crystal material, are formed in a bar shape, bubbles generated at the display screen area 100 cannot only easily move to the indisplay screen area 200. However, the bubbles may co-exist at the indisplay screen area 200 and may easily move again to the display screen area 100.

Figure 4:
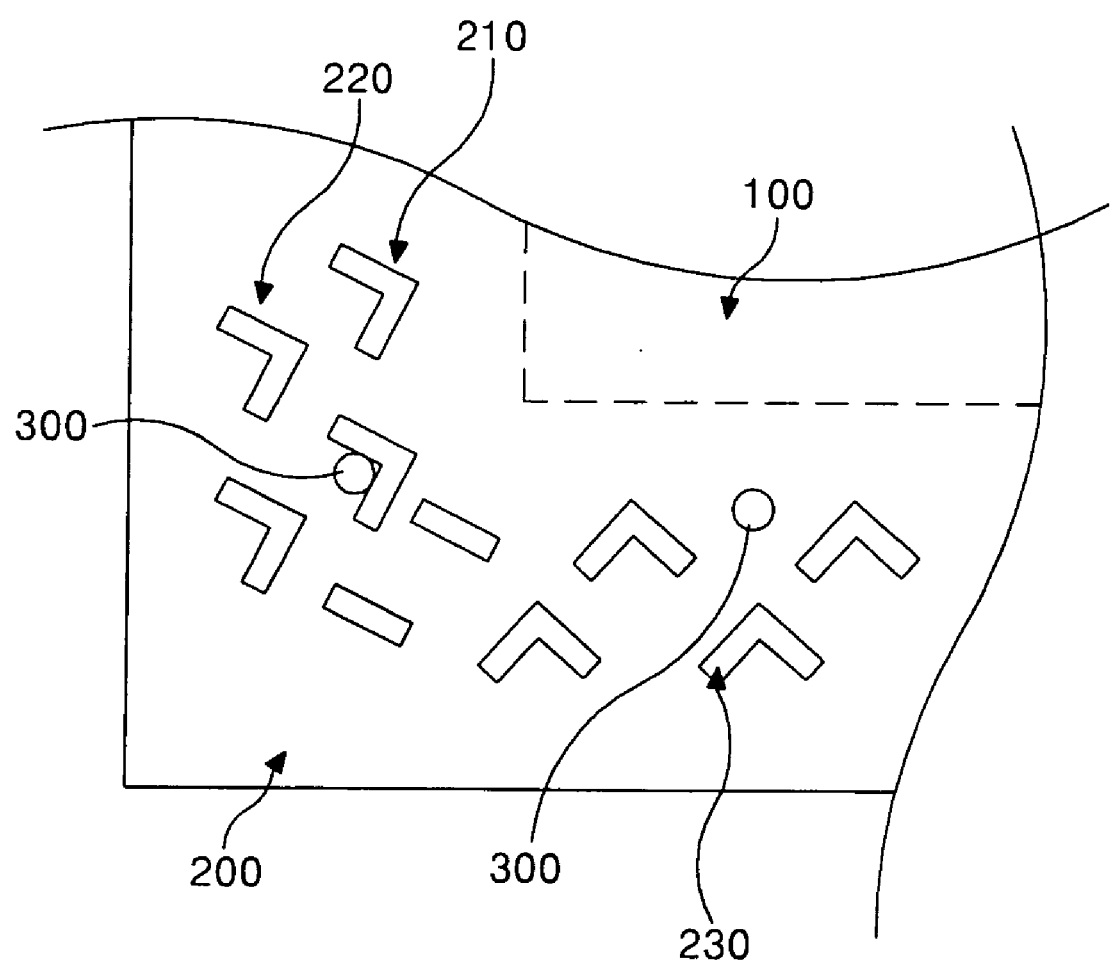
FIG. 4 is an enlarged plan view along A-A' of FIG. 2 showing an exemplary LCD panel according to the present invention.

FIG. 4 is an enlarged plan view along A-A' of FIG. 2 showing an exemplary LCD panel according to the present invention. In FIG. 4, there are formed a first sealant row 210 and a second sealant row 220 at the indisplay screen area 200, which is an outer area of the panel. The display screen area 190 has the liquid crystal display elements, to which liquid crystal material is formed, arranged to display a picture in accordance with a data signal supplied thereto.

The indisplay screen area 200 may be formed of a black matrix, and each of the first and second sealant rows 210 and 220 may be formed in the same manner as a pattern spacer (not shown) that sustains a gap of the cell into which the liquid crystal material is formed to display images. In other words, each of the first and second sealants 210 and 220 may bond the upper array substrate and the lower array substrate. In addition, each of the first and second sealants 210 and 220 allows bubbles 300, which are generated when the liquid crystal material is formed into the display screen area 100, to move to the indisplay screen area 200. The indisplay screen area 200 is formed of the black matrix to improve the contrast of the images displayed at the display screen area 100.

In FIG. 4, each of the first and second sealants 210 and 220 may be formed to have a plurality of bubble traps 230. For example, the bubble traps 230 may be formed as a pair of bar shapes that are connected at a designated angle. The bubble traps 230 guide the bubbles 300 to the indisplay screen area 200 from the display screen area 100, and intercepts the bubbles 300 that may remain in the indisplay screen area 200 so that the bubbles 300 do not flow into the display screen area 100.

Figure 5:
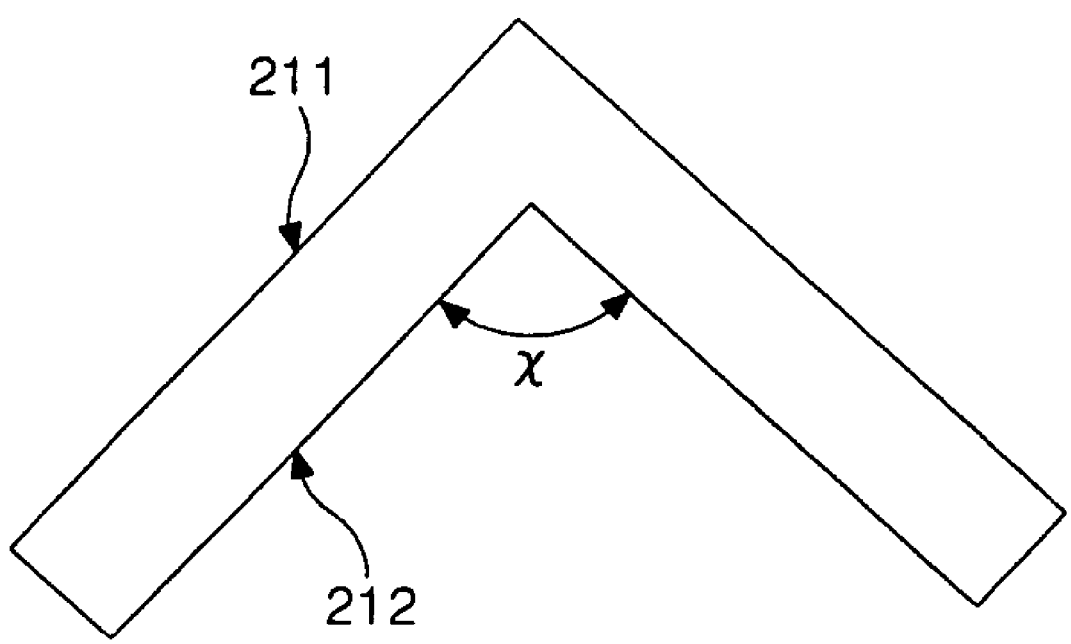
FIG. 5 is a plan view of an exemplary bubble trap according to the present invention.

FIG. 5 is a plan view of an exemplary bubble trap according to the present invention. In FIG. 5, the bubble traps 230 may be formed having a "V" shape. Specifically, a designated angle X between the bars which forms the bubble trap 230 may be desirably set at an angle to intercept at least one bubble 300, which is generated when the liquid crystal material is formed, so that the bubble 300 does not flow into the display screen area 100.

In FIGS. 4 and 5, each bubble trap 230 may face toward the display screen area 100 direction. The bubble trap 230 may have a guide surface 211 that allows the bubble 300 generated in the display screen area 100 to be guided to the indisplay screen area 200, and a shielding surface 212 that intercepts the bubble 300, which remains behind in the indisplay screen area 200, so that the bubble 300 does not flow into the display screen area 100. As shown in FIG. 4, an open area where each bubble trap 230 is open in an outer direction of the LCD panel may be set to intercept at least one bubble 300. Formation of the bubble trap 230 may be arranged so that the open area is formed concavely from the outer direction of the LCD panel to the inner direction.

In FIG. 4, the bubble trap 230 may be formed at the corner area of each of the first and second sealants 210 and 220 in a shape that a plurality of bars are connected in a designated angle or in a bar shape that the bars are arranged in a slant line direction. The bubble trap 230 forming each of the first and second sealants 210 and 220 may form a pattern spacer on a substrate in accordance with photolithographic and etching processes, and may be formed in the indisplay screen area 200 at the same time.

In addition, a bar type bubble trap 230 can be formed in the corner area of the LCD panel, wherein the bar type bubble trap 230 formed on the first sealant row 210 and the second sealant row 220 may be formed having different lengths. In other words, in the corner area of the LCD panel, a vacant area where the first sealant row 210 and the second sealant row 220 are not formed may have a different area from each other, thus it is desirable to make the length of the bar type bubble trap 230, which is formed at each of the first and second sealants 201 and 220, different from each other. Furthermore, when the bar type bubble trap 230 of each of the first and second sealants 210 and 220 is formed to have the same length, it is desirable to form a plurality of bar type bubble traps 230 at the corner area of the second sealant row 220, which is formed at the outer part of the LCD panel.

Figure 6:
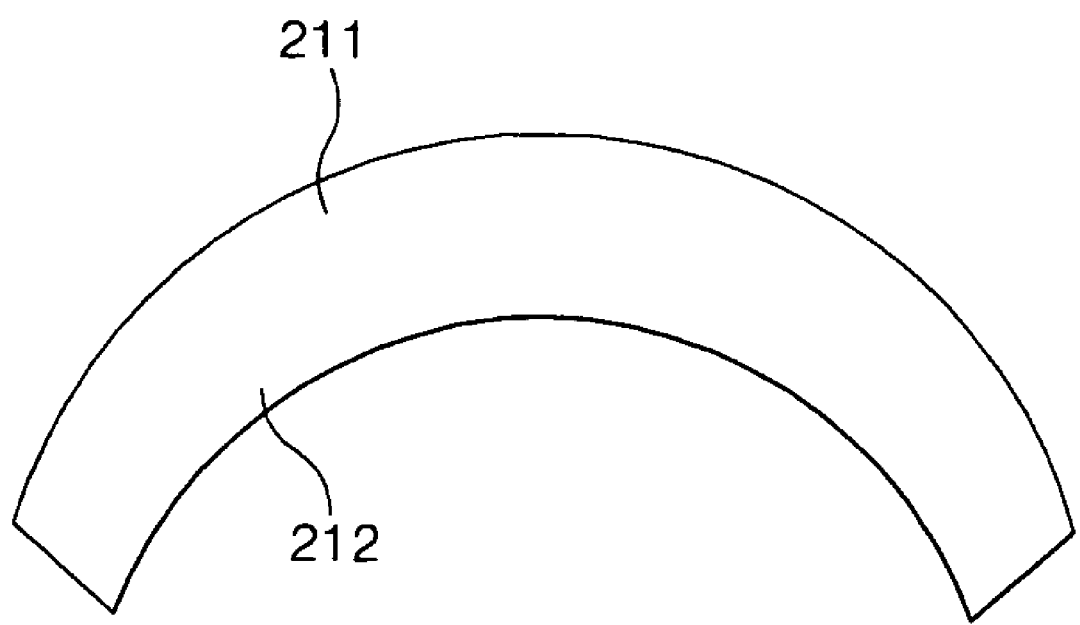
FIG. 6 is a plan view of another exemplary bubble trap according to the present invention.

FIG. 6 is a plan view of another exemplary bubble trap according to the present invention. In FIG. 6, a tong-type trap 230 may be formed having a "C" shape or a horseshoe shape with a gentle gradient. In addition, the tong-type bubble trap 230 may have a guide surface 211 to guide the bubbles 300 remaining in the display screen area 100 to move to the indisplay screen area 200, and a shielding surface 212 that intercepts the bubbles 300 that remain in the indisplay screen area 200 in order to prevent the bubbles 300 from flowing into the display screen area 100.

In FIG. 4, an open area, where each bubble trap 230 is open along the outer direction of the LCD panel, may be set to intercept at least one bubble 300. In addition, the bubble trap 230 may be provided so that the open area is formed concavely from the outer direction of the LCD panel to the inner direction. According to the present invention, the trap 230 may be formed at the same time as the spacer (not shown) and may be formed for uniformly keeping a gap between an upper plate and a lower plate of the LCD panel.

Figure 7:
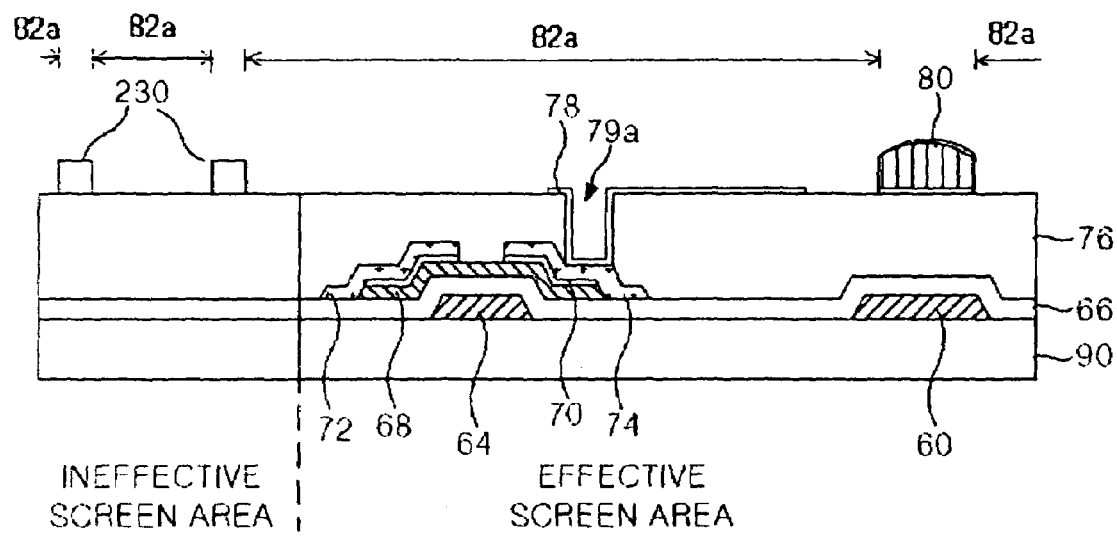
FIG. 7 is a cross-sectional view of an exemplary LCD device according to the present invention.

FIG. 7 is a cross-sectional view of an exemplary LCD device according to the present invention. In FIG. 7, the trap 230 is formed in the indisplay screen area 200, and at the same time, the spacer 80 may be formed to have a fixed gap in order to uniformly maintain the gap between the lower plate and the upper plate (not shown) in the display screen area 100. In addition, the LCD panel may further include a TFT, which includes a gate electrode 64, a gate insulating film 66, an active layer 68, an ohmic contact layer 70, and source and drain electrodes 72 and 74, all of which are sequentially deposited on the lower substrate 90, formed at an intersection of the gate line 60 and a data line (not shown), and a pixel electrode 78 formed at a pixel area. Accordingly, the gate electrode 64 is connected to the gate line 60, and the source electrode 72 is connected to the data line (not shown). In addition, the drain electrode 74 is in contact with the pixel electrode 78 through a contact hole 79A which is formed in the passivation layer 76 to protect the TFT.

In FIG. 7, the spacer 80 may be formed to overlap the gate line 60, and at the same time, the trap 230 may be formed in the indisplay screen area 200.

A fabricating method of an LCD device according to the present invention may include forming the gate electrode 64 connected to the gate line 60 on the substrate 90. The gate electrode 64 may be formed together with the gate line by patterning a metal thin film using photolithographic processes including a wet process after forming the metal thin film by a method, such as sputtering.

Subsequently, the gate insulating film 66, the active layer 68, and the ohmic contact layer 70 may be sequentially deposited on the lower substrate 90 where the gate electrode 64 is formed. The gate insulating film 66 may be formed by depositing an insulation material, such as silicon nitride or silicon oxide, on the substrate 90.

Next, the active layer 68 and the ohmic contact layer 70 may be formed by patterning an amorphous silicon layer and an amorphous silicon layer doped with impurities by photolithographic processes after depositing the amorphous silicon layer and the amorphous silicon layer doped with the impurities on the gate insulating film 66 by a chemical vapor deposition (CVD) method.

Then, the source and drain electrodes 72 and 74 may be formed on the gate insulating film 66 to cover the ohmic contact layer 70. The source and drain electrode 72 and 74 may be formed together with the data line by patterning a metal using photolithographic processes after depositing the metal on the gate insulating film 16 by the CVD method or the sputtering method to cover the ohmic contact layer 70.

The source and drain electrodes 72 and 74 are formed of molybdenum alloy, such as Mo, MoW, MoTa, or MoNb. The ohmic contact layer 70 between the source and drain electrodes 72 and 74 may be dry-etched to expose the active layer 68 between the source and drain electrodes 72 and 74. The source and drain electrodes 72 and 74 may be separated from each other with a designated gap therebetween to form a channel in correspondence to the gate electrode 64. Accordingly, if a scan pulse is applied to the gate electrode 64, the source and the drain electrodes 72 and 74 may become electrically conductive.

Next, the passivation film 76 may be formed on the lower substrate 90 where the TFT is formed. The passivation film 76 may be formed by patterning an insulation material after depositing the insulation material on the entire surface of the lower substrate 90. Then, a contact hole 79A may be formed to expose the drain electrode 74 when the passivation film is patterned.

Next, the pixel electrode 78 is formed on the passivation film 76, and a spacer photo resist 80 is sprayed on the pixel electrode 78 to overlap the gate line 60, and a trap photo resist 230 is sprayed on the indisplay screen area 200.

The pixel electrode 78 is formed by patterning a transparent conductive material after depositing the transparent conductive material that may include any one of indium tin oxide ITO, indium zinc oxide IZO, and indium tin zinc oxide ITZO. Accordingly, the pixel electrode 78 is electrically connected to the drain electrode 74 through the contact hole 79A.

The spacer photo resist 80 and the trap photo resist 230 may be formed in an ink jet spray method. After aligning the ink jet spray device (not shown) to correspond to the location of the gate line, the spacer photo resist 80 and the trap photo resist 230 may be sprayed onto the substrate 90 through the nozzle of the ink jet spray device. Herein, the spacer photo resist 80 may be a negative type that an area not exposed to light is removed to be patterned. Alternatively, the spacer photo resist 80 might be a positive type.

Subsequently, a positive type photo resist may be coated on the entire surface of the substrate including the spacer photo resist 80 and the trap photo resist 230. The positive type photo resist may be soft-baked to remove a solvent within the photo resist, thereby transforming it into a paste state. Herein, the photo resist may be different from the spacer photo resist 80 and the trap photo resist 230.

After this, a photo mask (not shown) having a transmission part and a shielding part may be aligned on the photo resist, the photo mask of the transmission part may be exposed to an ultraviolet UV ray by irradiating the ultraviolet ray thereto. At this moment, the shielding part may be aligned to correspond to an area where the spacer 80 and the trap 230 are to be formed.

Then, the photo resist of an area exposed to the ultraviolet ray, the spacer photo resist 80 and the trap photo resist 230 may be removed to be patterned. In case that the photo resist is the positive type, and the spacer photo resist 80 and the trap photo resist 230 are the negative type, an area 82A exposed to the ultraviolet ray may be removed in the photo resist. However, an area not exposed to the ultraviolet ray may be removed in the spacer photo resist 80 and the trap photo resist 230. Accordingly, both ends of the spacer photo resist 80 and the trap photo resist 230 may be removed.

After performing a hard baking process, an etchant may be sprayed to remove the pixel electrode where the photo resist is not formed in order to pattern it, and then the photo resist may be removed by a stripping process. However, the spacer photo resist 80 and the trap photo resist 230 may be formed of a material having a physical property resistant to stripping. In this way, after completing the stripping process, the spacer photo resist 80 becomes the spacer and the trap photo resist 230 becomes the trap.

It will be apparent to those skilled in the art that various modifications and variations can be made in the liquid crystal display and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device having a liquid crystal display panel, comprising:
   a liquid crystal area defined by a first sealant having openings at each corner and a second sealant having shaped of closed loop, wherein the second sealant is formed separated from the first sealant with a designated distance therebetween; and
   a plurality of bubble traps formed in a part between the first sealant and the second sealant,
   wherein the bubble traps are arranged near at every corner of the liquid crystal display panel, and patterned to have a concave surface facing toward the second sealant, respectively, and include a guide surface that guides at least one bubble flowing from the opening to the second sealant and a shielding surface that intercepts the bubble moving from the part to the liquid crystal area, respectively,
   wherein the shielding surface forms an open area of a designated size that intercepts the bubble moving from the part to the liquid crystal area,
   wherein the bubble traps include a plurality of first traps arranged to face the openings formed at each corner of the first sealant, and a plurality of second traps disposed at both sides of the plurality of the first traps,
   wherein each of the first traps is a linear shape trap, and the each of the second traps is any one of a horseshoe shape trap, a "C" shape trap, and a "V" shape trap, and
   wherein the direction of the second traps disposed at left side of the first traps is different from that of the second traps disposed at right side of the first traps 2. A method of fabricating a liquid crystal display device having a liquid crystal display panel, comprising the steps of:
   forming a first sealant having openings at each corner and a second sealant having shaped of closed loop in any one of an upper plate and a lower plate to define a liquid crystal area of the liquid crystal display panel, wherein the second sealant may be formed separated from the first sealant with a designated distance therebetween;
   patterning a plurality of bubble traps in a part between the first sealant and the second sealant, wherein the bubble traps have a concave surface facing toward the second sealant, respectively;
   forming a spacer to maintain a cell gap between the upper plate and the lower plate;
   forming a liquid crystal into the liquid crystal area; and
   bonding the upper plate and the lower plate by use of the first sealant and second sealant,
   wherein the bubble traps are simultaneously formed along with the spacer in an ink jet spray method on the lower plate,
   wherein the bubble traps include a plurality of first traps arranged to face the openings formed at each corner of the first sealant, and a plurality of second traps disposed at both sides of the plurality of the first traps,
   wherein each of the first traps is a linear shape trap, and the each of the second traps is any one of a horseshoe shape trap, a "C" shape trap, and a "V" shape trap, and
   wherein the direction of the second traps disposed at left side of the first traps is different from that of the second traps disposed at right side of the first traps.

* * * * *